United States Patent [19]

Schneider et al.

[11] Patent Number: 4,458,791
[45] Date of Patent: Jul. 10, 1984

[54] BRAKE CONTROL SYSTEM WITH METERING PUMP RELIEF

[75] Inventors: Marvin L. Schneider, Peoria; Kenneth F. Golan, Pekin, both of Ill.

[73] Assignee: Caterpillar Tractor Co., Peoria, Ill.

[21] Appl. No.: 414,283

[22] PCT Filed: Jul. 12, 1982

[86] PCT No.: PCT/US82/00935
§ 371 Date: Jul. 12, 1982
§ 102(e) Date: Jul. 12, 1982

[87] PCT Pub. No.: WO84/00334
PCT Pub. Date: Feb. 2, 1984

[51] Int. Cl.³ .............................................. B60T 13/22
[52] U.S. Cl. ...................................... 188/170; 60/413; 60/486; 303/71; 303/10
[58] Field of Search ................. 303/71, 6 M, 116, 64, 303/50, 13, 10–12, 2; 188/170; 192/4 R, 12 C, 4 A, 17 A, 109 R, 109 F; 60/413, 484, 905, 422, 486; 254/379, 367

[56] References Cited
U.S. PATENT DOCUMENTS 3,762,777 10/1973 Jacob ............................ 188/170 X
3,871,714 3/1975 Behrend ............................ 303/10
4,048,799 9/1977 Golan et al. ........................ 60/413
4,256,350 3/1981 Hoefer .............................. 303/71 X
4,262,969 4/1981 Chatterjea ....................... 303/6 M X
4,278,155 7/1981 Golan et al. ...................... 192/4 R
4,337,926 7/1982 Dehaan ........................... 188/170 X Primary Examiner—Douglas C. Butler
Attorney, Agent, or Firm—John W. Grant

[57] ABSTRACT

This invention relates to a brake control system (10) for controlling engagement and disengagement of a spring applied pressure released brake (11) of a winch and includes an orifice (39) and a relief valve (37) connected in series to the outlet port of a metering pump (23) to relieve pressure in the outlet port at a lower than normal pressure level when the fluid flow therethrough is below a predetermined flow rate. Relieving the pressure at the outlet port of the metering pump reduces the pressure differential between the inlet port (24) and outlet port (26) of the metering pump and thereby drastically reduces the internal leakage within the metering pump so that the metering pump is operative to pump fluid from the actuating chamber (14) at the slow rotational speeds of the rotatable member (12).

4 Claims, 1 Drawing Figure

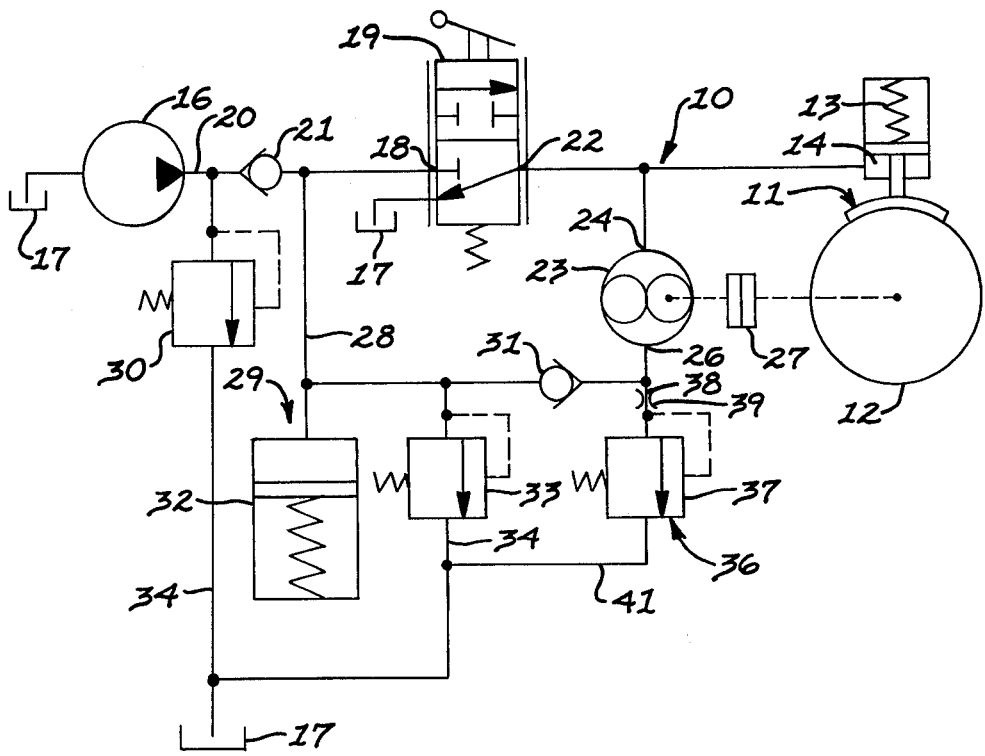

BRAKE CONTROL SYSTEM WITH METERING PUMP RELIEF

DESCRIPTION

1. Technical Field

This invention relates generally to a brake control system for a spring applied, pressure released brake on a winch and more particularly to a device for reducing the normal outlet pressure of a metering pump at low operating speeds of the winch.

2. Background Art

The winches used on pipelayers and the like commonly have a hydraulically disengaged brake operative to control the lowering of a supported load by controlling rotation of a cable drum of the winch. The brake control system sometimes has an accumulator connected between the pump and the control valve for providing an auxiliary source of pressurized hydraulic fluid for disengaging the brake to lower a suspended load when the pump is inoperative. The accumulator is charged to a predetermined pressure determined by a relief valve. To achieve steady lowering of the suspended load, the fluid pressure in the actuating chamber of the brake must be maintained constant. This is sometimes accomplished by a metering pump driven by the winch drum to pump fluid from the actuating chamber at a rate proportional to the rotational speed of the drum and at a rate essentially the same as the rate of flow through the control valve. Thus a constant pressure is maintained at a given position of the control valve. To conserve fluid when the accumulator is used as the source of fluid pressure, and to maintain accumulator pressure in normal operation, the metering pump directs the fluid back to the inlet of the control valve in a regenerative manner and must thereby pump the fluid against at least the pressure established by the relief valve which is substantially higher than the pressure required for initial reduction of braking force.

Some examples of such brake control systems are disclosed in U.S. Pat. No. 4,048,799 issued to Golan et al. on Sept. 20, 1977 and U.S. Pat. No. 4,278,155 issued to Golan et al. on July 14, 1981.

One of the problems associated with such brake control system is that of internal leakage between the inlet and outlet ports of the metering pump resulting from the pressure differential between the inlet and outlet ports. At very slow lowering speeds and relatively high pressures, the internal leakage within the metering pump reduces its efficiency so that the amount of fluid pumped from the actuating chamber is less than the amount of fluid directed to the actuating chamber by the control valve. Thus, the fluid pressure in the actuating chamber continues to increase for a given setting of the control valve thereby causing greater than desired disengagement of the brake and unexpected faster lowering of the load. Thus the control system does not provide the precision slow speed control required for lowering heavy loads. The internal leakage does not cause any problems at moderate or fast lowering speeds wherein the fluid flow necessary to maintain constant pressure in the actuating chamber is greater than the internal leakage of the metering pump.

The present invention is directed to overcoming one or more of the problems as set forth above.

DISCLOSURE OF THE INVENTION

In one aspect of the present invention a brake control system for actuation of a spring applied pressure released brake between engaged and disengaged conditions for respectively stopping and allowing rotation of a rotatable member includes a pump, a control valve having an inlet connected to the pump and an outlet connected to an actuating chamber of the brake, said control valve being movable between a first position at which the inlet port is blocked from the outlet port and a plurality of operative positions at which communication between the inlet and outlet ports is controllably modulated, a metering pump drivingly connected to the rotatable member and having inlet and outlet ports with the inlet port being connected to the outlet of the control valve, a conduit connecting the outlet port of the metering pump with the inlet port of the control valve, means for normally maintaining the pressure in the conduit at a predetermined operating level, and means for relieving the pressure in the outlet port of the metering pump at a pressure level lower than the predetermined operating level when fluid flow therethrough is below a predetermined flow rate so that the pressure differential across the metering pump is reduced.

The advantages offered by the present invention is that the metering pump is not subjected to the normal back pressure in the outlet port when the flow rate therethrough is below a predetermined flow rate. With the fluid pressure at the outlet port thus relieved the internal leakage in the metering pump is drastically reduced so that the metering pump thereby functions in its normal manner of pumping fluid from the actuating chamber at a flow rate proportional to the rotational speed of the rotatable member thereby allowing precise slow speed lowering of a suspended load.

BRIEF DESCRIPTION OF THE DRAWING

The sole FIGURE is a schematic of an embodiment of the present invention.

BEST MODE FOR CARRYING OUT THE INVENTION

Referring now to the drawing, a brake control system generally indicated by the reference numeral 10 provides actuation of a spring applied, pressure released brake 11 between engaged and disengaged conditions for respectively stopping and allowing rotation of a rotatable member 12. The brake 11 typically includes a spring 13 for providing the engaging force and an actuating chamber 14 for receiving pressurized fluid to compress the spring 13 for disengaging the brake. The rotatable member 12 can be a rotatable member of a winch such as a winch drum or a member associated with rotation of the winch drum.

The brake control system 10 includes a pump 16 having its inlet connected to a reservoir 17 and its outlet connected to an inlet port 18 of a control valve 19 through a conduit 20 and check valve 21. An outlet port 22 of the control valve 19 is connected to the actuating chamber 14 of the brake. The control valve 19 is movable between a neutral position at which the inlet port 18 is blocked from the outlet port 22 and a plurality of variable operative positions at which communication between the inlet and outlet ports is controllably modulated.

A metering pump 23 has an inlet port 24 and an outlet port 26 and is drivingly connected to the rotatable member through a one-way clutch 27. The inlet port 24 is connected to the actuating chamber 14 of the brake 11. The outlet port 26 is connected to the inlet port 18 of the control valve 19 through a conduit 28.

A means 29 is provided for normally maintaining the pressure in the conduit 28 at a predetermined operating level. The pressure maintaining means 29 can include a relief valve 30 connected to the conduit 20 between the pump 16 and the check valve 21, a check valve 31 positioned in the conduit 28, and an accumulator 32 connected to the conduit 28 between the check valve 31 and the inlet port 18. Another relief valve 33 is connected to the conduit 28 between the check valve 31 and inlet port 18 to relieve excessive pressure in the conduit 28. A conduit 34 connects the relief valves 30 and 33 to the reservoir 17.

While the reservoir 17 is shown symbolically, such reservoir is normally the housing containing the winch drive mechanism and the fluid passing through conduit 34 is normally directed to the winch drive mechanism for lubrication purposes.

A means 36 is provided for relieving the pressure in the outlet port 26 of the metering pump 23 at a pressure level lower than the predetermined operating level when fluid flow therethrough is below a predetermined flow rate so that the working pressure differential is reduced. Such pressure relieving means 36 includes a relief valve 37, a conduit 38 connecting the relief valve to the outlet port 26 of the metering pump 23, and a restrictive orifice 39 positioned in the conduit 38. A conduit 41 connects the relief valve 37 to the conduit 34.

INDUSTRIAL APPLICABILITY

In operation, upon initial starting of the pump 16, hydraulic fluid is pumped through the conduit 20, the check valve 21 and the conduit 28. With check valve 31 blocking fluid flow to the outlet port 26 of the metering pump 23, the accumulator 32 is filled to a pressure as determined by the relief valve 30 which in the present case is approximately 2600 kPa (375 psi). After the accumulator is filled, the relief valve 30 opens and directs excess fluid through conduit 34 to the reservoir 17.

To lower a load supported by the rotatable member 12, the control valve 19 is moved from the neutral position shown to an operative position to direct pressurized fluid from the pump 16 to pressurize the actuating chamber 14 of the brake 11. This reduces the effective force of the spring 13 thereby controllably allowing the rotatable member 12 to rotate under the influence of the load. The rotational speed of the rotatable member is controlled by controlling the fluid pressure in the actuating chamber. The pressure in the actuating chamber necessary to release the brake is somewhat dependent upon the weight of the load being supported by the rotatable member. Rotation of the rotatable member 12 drives the metering pump 23 through the one-way clutch 27. The metering pump 23, in turn, pumps fluid from the actuating chamber 14 at a flow rate proportional to the rotational speed of the rotatable member 12.

The fluid exiting the metering pump 23 through the outlet port 26 can take one of two different flow paths depending upon the flow rate. If the flow rate is below a predetermined flow rate such as would occur when the load is being inched into place, the fluid passes through the restrictive orifice 39, relief valve 37, conduit 41 and empties into the reservoir 17. The relief valve 37 is set to open at a pressure lower than the 2600 kPa operating pressure normally maintained in the conduit 28. The pressure required to open the relief valve 37 is somewhat greater than the fluid pressure required to release the brake and in the present invention may be somewhere between 900 and 1100 kPa (130 and 160 psi). When the rotatable member 12 is rotated at a higher speed, the metering pump 23 pumps fluid through the outlet port 26 at a higher flow rate. When the flow rate exceeds the capacity of the orifice 39, which in this invention is about 1.85 liters (0.5 gallons) per minute, sufficient pressure is generated by the flow from the metering pump so that such fluid opens the check valve 31 and a portion thereof passes through conduit 28 back to the inlet port 18 of the control valve 19 in a regenerative fashion. Under this condition, a small portion of the fluid will still pass through the orifice 39 and the relief valve 37.

In view of the foregoing it is readily apparent that the structure of the present invention provides an improved brake control system with metering pump relief which provides precision control over lowering loads at a slow speed. This is accomplished through the use of an orifice and an additional relief valve connected in series to the outlet port of the metering pump to relieve the pressure in the outlet port at a predetermined pressure level in response to fluid flow therethrough being below a predetermined flow rate. Thus the pressure differential between the inlet port and the outlet port of the metering pump is reduced resulting in a drastic reduction in the internal leakage within the metering pump at such slow speeds. The metering pump can thus pump fluid from the actuating chamber of the brake at a rate proportional to the rotational speed of the rotatable member in a normal manner.

Other aspects, objects and advantages of this invention can be obtained from a study of the drawings, the disclosure and the appended claims.

We claim:

1. In a brake control system (10) for actuation of a spring applied pressure released brake (11) between engaged and disengaged conditions for respectively stopping and allowing rotation of a rotatable member (12), the system including a pump (16), a control valve (19) having an inlet port (18) connected to the pump and an outlet port (22) connected to an actuating chamber (14) of the brake, said control valve being movable between a first position at which the inlet port (18) is blocked from the outlet port (22) and a plurality of operative positions at which communication between the inlet (18) and outlet (22) ports is controllably modulated, a metering pump (23) having an inlet port (24) and an outlet port (26) with said inlet port (24) being connected to the actuating chamber (14) of the brake, said metering pump being drivingly connected to the rotatable member (12), a conduit connecting the outlet port (26) of the metering pump with the inlet port (18) of the control valve (19), and means (29) for normally maintaining the pressure in the conduit (28) at a predetermined operating level, the improvement comprising:

means (36) for relieving the pressure in the outlet port (26) of the metering pump (23) at a pressure level lower than said predetermined operating level when fluid flow therethrough is below a predetermined flow rate so that the working pressure differential across the metering pump is reduced.

2. The brake control system (10) of claim 1 wherein said means (36) for relieving the pressure in the outlet port (26) includes a relief valve (37), a conduit (38) connecting the relief valve and the outlet port (26) of the metering pump (23) and a restrictive orifice (39) in the conduit.

3. The brake control system (10) of claim 2 wherein said predetermined flow rate is established by said orifice (39).

4. The brake control system (10) of claim 3 wherein a portion of the fluid in the outlet port (26) of the metering pump (23) passes through the conduit (28) when the rate of flow through the outlet port (26) exceeds the predetermined flow rate.

* * * * *